Feb. 10, 1942.  W. M. HANNA  2,272,991
PROTECTIVE SYSTEM
Filed March 22, 1940
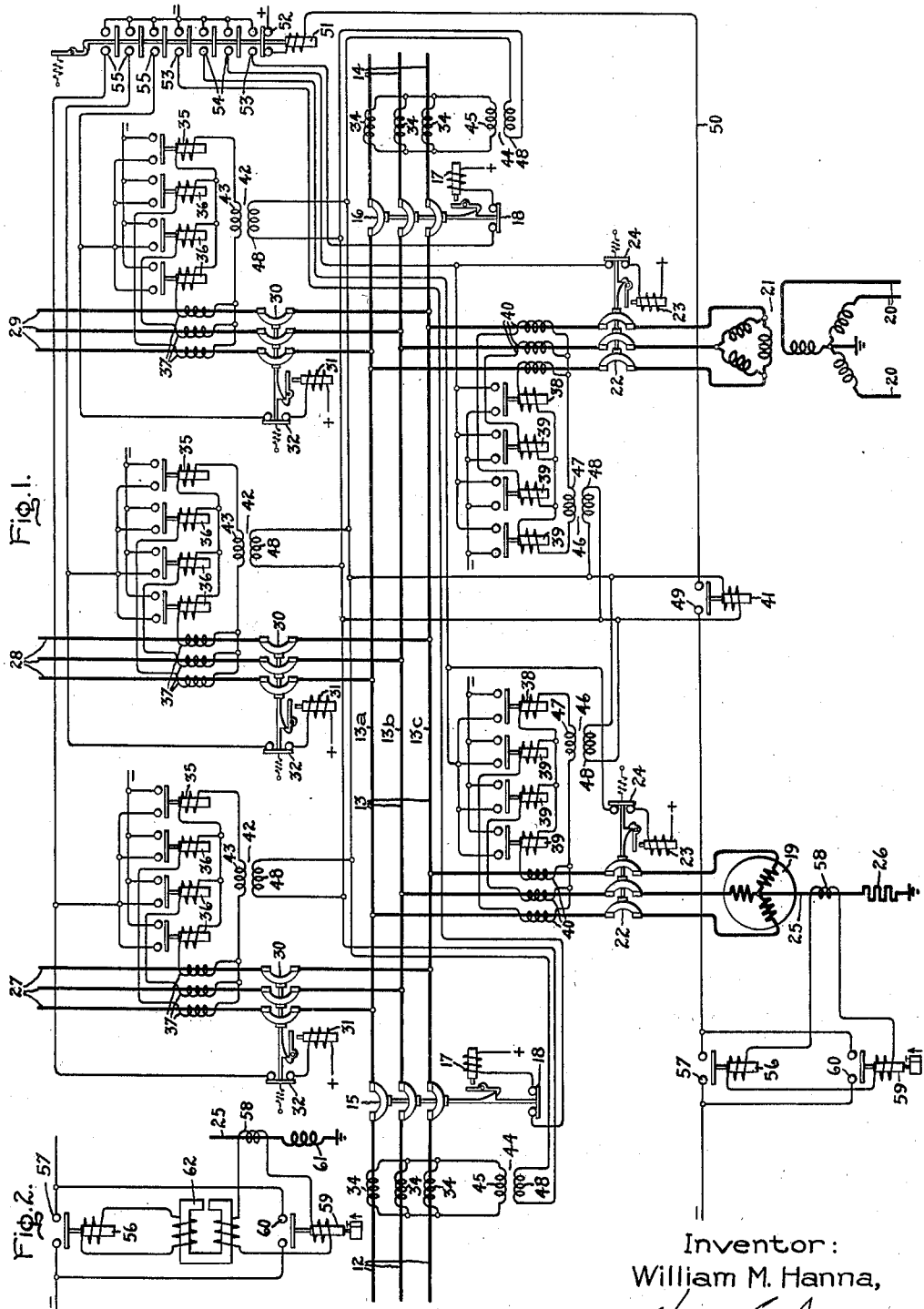
Inventor:
William M. Hanna,
by Harry E. Dunham
His Attorney.

Patented Feb. 10, 1942

2,272,991

UNITED STATES PATENT OFFICE 2,272,991

PROTECTIVE SYSTEM

William M. Hanna, Schenectady, N. Y., assignor to General Electric Company, a corporation of New York Application March 22, 1940, Serial No. 325,413

9 Claims. (Cl. 175—294)

My invention relates to a protective system which is particularly applicable to apparatus in which switches, bus bars, and the like are arranged in one or more sections whereby, in the event of trouble in one section, that section may be completely isolated from the rest of the system.

Various means have been proposed in connection with polyphase alternating-current systems and particularly as to bus-bar protection for reducing or eliminating the possibility of interphase short circuits. For example, the phases and apparatus associated with each phase have been isolated from each other by various means, such as by wide separation thereof in the case of outdoor bus bars or by being separately enclosed in insulating structures in the case of indoor bus bars. While the possibility of interphase short circuits in such systems is almost entirely removed, there still remains the danger, particularly when the system is supplied by a Y-connected source having a grounded neutral, of a fault from any phase to ground inasmuch as the various switches, switch-operating mechanisms, bus-insulator supports, current transformers, etc., usually are grounded.

Busses are frequently protected against ground faults by a differential protective system which operates on the basis of the difference between the currents into and from a section of the bus. This arrangement requires a plurality of parallel connected current transformers, one at every point where current is supplied to or taken from the bus. These current transformers must be carefuly coordinated as to ratio and capacity characteristics throughout their operating range in order to avoid false operation of the protective relays because of an apparent ground fault current due to ratio departure of the current transformers. Any attempt to avoid this false operation by raising the relay settings seriously impairs the quality of the protection. Because of the difference in capacity and ratio of the feeder and bus current transformers, it is practically impossible to coordinate current transformers with any reasonable degree of certainty or economy. In consequence of this, even though there is a balance between the actual power currents into and from the bus especially under fault conditions external of the bus, these currents as reflected in the current transformer secondary windings produce an apparent difference which tends to and may cause incorrect relay operation resulting in the isolation of a sound bus section which is very undesirable.

In order to prevent the ground fault relays from tripping on apparent ground fault currents due to external faults, it has been suggested to connect the contacts of the ground fault relay protecting the particular bus section in series with contacts of another relay responsive to the current flowing in the grounded neutral of the Y-connected source supplying this bus section. The relay equipment by this arrangement, therefore, can easily distinguish the difference between external phase faults and internal short circuits. Any fault not involving ground in such an arrangement prevents the relay associated with the grounded neutral from closing its contacts and, therefore, even though apparent fault currents cause energization of the ground fault relay, tripping of the circuit breakers will not occur.

I have discovered, however, that double line-to-ground short circuits external of the protected bus section, such as on a feeder, for example, will cause a current to flow in the grounded neutral of the Y-connected source feeding the bus bar so that the relay associated therewith closes its contacts. Furthermore, since the interphase component of this double line-to-ground fault current may be many times higher than the ratings of the current transformers of the associated protective system, these current transformers will saturate and probably indicate an apparent ground fault current in the residual circuit so as to cause the ground fault relay to close its contacts whereby isolation of the bus section occurs even though the fault is external thereto. If the external fault happened to be only a single line-to-ground fault, isolation of the sound bus section would not occur even though the relay associated with the ground circuit of the Y-connected source supplying the bus were to close its contacts because the relatively high impedance in this ground circuit limits the fault current whereby the current transformer inaccuracies are ineffective to cause sufficient apparent ground current to flow in the ground fault relay circuit. In fact, it is quite customary to provide a ground impedance having such a value that the ground fault current is less than twice normal load current, in which case, the errors of the current transformers would be very small.

It is an object of my invention, therefore, to provide a new and improved protective system which will prevent isolation of a sound bus section due to inaccuracies in the associated current transformers.

It is another object of my invention to provide an improved protective arrangement for bus bars which, on the occurrence of faults, discriminates between a double line-to-ground and a single line-to-ground short circuit.

Further objects and advantages of my invention will become apparent as the following description proceeds and the features of novelty which characterize my invention will be pointed out with particularity in the claims annexed to and forming a part of this specification.

My invention will be better understood from the following description taken in connection with the accompanying drawing in which Fig. 1 illustrates schematically a bus-bar protective system embodying my invention, and Fig. 2 is a partial view of a similar system showing a modification of my invention.

Referring now to Fig. 1 of the drawing, I have illustrated my invention as applied to a polyphase alternating-current sectionalized bus system of which three sections 12, 13, and 14 are schematically illustrated. Only one section 13 is shown completely since the others are substantial duplicates as far as my invention is concerned. Although I have illustrated my invention as specifically applied to a bus system, it will be understood by those skilled in the art that other applications are also possible, the bus system having been chosen by way of example only. Bus section 13 is illustrated as a three-phase bus including phases 13a, 13b, 13c. The bus sections 12, 13, and 14 are shown as interconnected by suitable switching means, such as latched closed circuit breakers 15 and 16, each provided with trip coils 17 and an auxiliary switch 18 which is closed when the circuit breaker is closed and open when the circuit breaker is open. Such auxiliary switches are commonly known as a switches.

Each bus section, such as 13, for example, may have one or more sources of supply which I have indicated, for example, as a Y-connected generator 19, and a source of power 20 connected to the bus section 13 through a suitable transformer 21. In order to disconnect the sources 19 and 20 from the bus section 13 in case of a fault, suitable switching means such as circuit breakers 22 are provided, each having a trip coil 23 and an auxiliary or a switch 24. The neutral of Y-connected generator 19 is provided with a suitable ground connection 25 including an impedance illustrated as a resistance 26 for limiting the ground fault current that may flow.

A plurality of feeders, such as 27, 28, and 29, are connected to bus section 13 through suitable switching means, such as latched closed circuit breakers 30, which are provided with trip coils 31 and auxiliary or a switches 32.

Since my invention is particularly concerned with ground fault protection, I have not illustrated the protective apparatus which would be necessary to protect the bus section for interphase faults thereon. However, if the bus comprising sections 12, 13, and 14 were an isolated phase type of installation, the possibility of interphase short circuits is so remote that a protective system for this purpose might not be necessary. If a fault should occur in generator 19, transformer 21, feeders 27, 28, and 29, or bus sections 12 and 14, in other words, an external fault, it is desirable to disconnect such faulted device or apparatus from protected bus section 13. Although many different types of protective systems may be used for this purpose, by way of example, I have illustrated my protective system as provided with overcurrent protection against both phase and ground faults for all of these circuits supplying power to or taking power from bus section 13 except for bus sections 12 and 14 which are preferably of the isolated phase type. In order to obtain differential ground fault protection of bus section 13, however, each of the phases of bus sections 12 and 14 are provided with a current transformer 34, the function of which will be described in greater detail hereinafter.

Each of the feeders 27, 28, and 29 is provided with protection both for phase and ground faults including overcurrent ground fault relays 35 and overcurrent phase fault relays 36 which are arranged to be suitably energized from current transformers 37 associated with the respective phases of feeders 27, 28, and 29. The energization of any of the phase fault relays 36 or ground fault relays 35 on feeders 27, 28, or 29 will energize the respective trip coil 31 through a switch 32 of the associated circuit breaker 30 on the particular feeder wherein the fault condition occurs.

Generator 19 and transformer 21 are also provided with protective apparatus of the overcurrent type identical with that associated with feeders 27, 28, and 29 comprising overcurrent ground fault relays 38 and overcurrent phase fault relays 39 arranged to be energized in the conventional manner from suitable current transformers 40, each associated with one of the phases connected to the respective phases of bus section 13. An abnormal current condition in any of these phases will cause energization of one of the ground fault relays 38 or phase fault relays 39 which, in turn, will cause energization of trip coils 23 through auxiliary or a switches 24 whereupon the particular circuit breaker 22 associated with the faulted apparatus is caused to isolate this apparatus relative to the bus section 13.

My invention is particularly concerned with protection against ground faults in bus section 13 and, under such conditions, it is necessary completely to isolate this section by simultaneously tripping sectionalizing circuit breakers 15 and 16, feeder breakers 30, and circuit breakers 22 through which generator 19 and source 20 are connected to the bus section 13. The means for accomplishing one step in the direction of this simultaneous tripping action is shown as a differential ground fault relay 41. Relay 41 is arranged to be energized by a current dependent upon the vector sum of all the currents flowing into and out of the bus section 13. Accordingly, I provide an auxiliary transformer 42 for each feeder circuit 27, 28, and 29 having the primary winding 43 thereof connected in series with the residual circuit including ground fault relays 35 of the feeder protective apparatus. Similarly, a transformer 44 is provided for each of the bus sections 12 and 14 having its primary winding 45 connected to the secondary windings of current transformers 34 associated with the respective bus sections. Also, a similar transformer 46 is provided for each of the protective circuits for generator 19 and transformer 21 having the primary winding 47 thereof connected in series with the associated ground fault relay 38. Each of the transformers 42, the transformers 44, and the transformers 46, includes a secondary winding 48, and these secondary windings are all connected in parallel providing a differential circuit for energizing differential relay 41. Any ground relays protecting against interphase faults will be provided although not shown in Fig. 1 and cause isolation of bus section 13 even though the ground relay 56 and differential ground fault relay 41 do not operate to cause tripping of all of the connected circuit breakers.

The operation of the protective system illustrated in Fig. 1 will be understood by those skilled in the art. Due to the operation of relay 56, a double line-to-ground short circuit will not cause energization thereof and, hence, an external fault of this type cannot cause isolation of bus section 13 even though ground fault differential relay 41 is energized by the apparent ground fault current due to current transformer inaccuracies. Isolation of bus section 13 according to Fig. 1 can only be caused by single line-to-ground short circuit and, if the bus is of the isolated phase type, this is the only protection that is needed. If interphase faults can occur on bus section 13, a protective system will be provided, as mentioned hereinbefore, which will completely isolate bus section 13 on an internal double line-to-ground fault which will not cause operation of the ground fault protective system of my invention.

In many protective systems, the neutral of the Y-connected source supplying the protected bus section is grounded through an impedance which may comprise a reactance. Under these conditions, the direct-current component of a line-to-ground or double line-to-ground fault due to the much longer time constant of the circuit becomes a sufficiently large factor so that the two-to-one ratio in ground fault currents between these two different types of faults no longer exists. In such installations, in order that the protective system may distinguish between double line-to-ground and single line-to-ground faults, it is necessary to eliminate the effect of the direct-current component of these fault currents. In Fig. 2, I have shown a portion of the protective system of Fig. 1 wherein the ground circuit 25 includes a reactance 61 which increases the time constant of the circuit sufficiently so that the direct-current component of the fault currents becomes important. The corresponding parts of Fig. 2 are designated by the same reference numerals as in Fig. 1. In order to eliminate the direct-current component of fault current from ground relay 56, I provide a current transformer 62 preferably having a one-to-one ratio and having an air gap in the core thereof so as practically to eliminate the direct-current component of the fault current as far as its effect on relay 56 is concerned and, therefore, would preserve the two-to-one relationship between double line-to-ground and single line-to-ground short-circuit currents in so far as ground relay 56 is concerned.

While I have shown and described certain particular embodiments of my invention, it will be apparent to those skilled in the art that my invention has other applications and that changes and modifications may be made without departing from the spirit and scope of my invention. I, therefore, aim in the appended claims to cover all such modifications and changes.

What I claim as new and desire to secure by Letters Patent of the United States is:

1. In a protective system for an electric circuit subject to the occurrence of fault conditions thereon, switching means for isolating a portion of said circuit on the occurrence of a fault condition thereon, and means dependent upon the magnitude of the actual ground current for distinguishing between double line-to-ground and single line-to-ground faults on said circuit for controlling the operation of said switching means.

2. In a protective system for an electric circuit including conductors, switching means for interrupting said circuit, and means dependent upon the magnitude of actual ground current flowing in said circuit for causing operation of said switching means only upon the occurrence of a fault involving but a single conductor of said circuit.

3. In a protective system for an electric circuit connected to a source of current having a grounded connection through which current flows when any conductor of said circuit is grounded while said circuit is connected to said source, switching means for interrupting said circuit, and means for controlling the operation of said switching means in dependence upon the magnitude of the current flowing in said grounded connection so that operation of said switching means occurs only when said last-mentioned current bears a predetermined relation to the maximum current that can flow in said grounded connection upon the occurrence of a ground fault involving more than one conductor of said circuit.

4. In a protective system for an electric circuit connected to a source of current having a grounded connection through which current flows when any conductor of said circuit is grounded while said circuit is connected to said source, switching means for interrupting said circuit, and means for controlling the operation of said switching means in dependence upon the magnitude of the current flowing in said grounded connection of said source so that operation of said switching means occurs only when said last-mentioned current is in excess of the maximum current that can flow in said grounded connection upon the occurrence of a ground fault involving more than one conductor of said circuit.

5. In a polyphase alternating-current circuit, a protective system for causing isolation of any unsound section of said circuit on the occurrence of fault conditions thereon including means for deriving a current dependent upon the vector sum of the currents supplied to and leaving said unsound section, and means for distinguishing between double line-to-ground and single line-to-ground faults on said circuit for initiating the operation of said protective system only when said last-mentioned type of fault occurs.

6. An alternating-current electric system comprising a sectionalized bus, a plurality of feeders connected to one section of said bus, means for supplying alternating current to a plurality of sections of said bus, means for isolating said one section on the occurrence of a fault thereon including means for deriving a current dependent on the vector sum of all the currents into and out of said section, a relay responsive to said derived current tending to initiate the isolation of said section, and means for preventing said relay from causing isolation of said section except upon the occurrence of a single line-to-ground fault thereon.

7. In a protective system for a polyphase alternating-current sectionalized bus, a plurality of feeders connected to one section of said bus, a Y-connected source of electrical energy having a grounded neutral for supplying alternating current to said section, a plurality of switching means for isolating said section upon the occur-fault in protected section 13 will cause a current to flow in the differential circuit including secondary windings 48 and differential relay 41, thereby causing energization of the latter to close its contacts 49.

The closing of contacts 49 of ground fault differential relay 41 is one step in the direction of controlling the energizing circuit 50 of an auxiliary multiple-contact tripping relay 51 through normally closed contacts 52. This tripping relay 51 when energized closes a plurality of contacts 53, a plurality of contacts 54, and a plurality of contacts 55 connected in the respective circuits of the trip coils 17, 23, and 31 through a switches 18, 24, and 32 of the associated circuit breakers whereby to effect a simultaneous tripping operation of all the circuit breakers 15, 16, 22 and 30, respectively. The contacts 53 control the tripping of circuit breakers 15 and 16, the contacts 54 control the tripping of circuit breakers 23, and the contacts 55 control the tripping of circuit breakers 30. As shown, the auxiliary tripping relay 51 is of the hand-reset type, which, upon operating to close its contacts, deenergizes its own circuit at the contacts 52.

In order to prevent all of the circuit breakers 15, 16, 22, and 30 from tripping when an external interphase fault causes apparent ground currents due to the inaccuracies of the current transformers 34, 37, and 40 to energize differential ground fault relay 41, I provide a ground relay of the high-speed type 56 adapted to close contacts 57 in series with contacts 49 of differential ground fault relay 41 when energized from the secondary winding of current transformer 58 connected in the ground circuit 25 of Y-connected generator 19. By this arrangement, there must be an actual ground current and, hence, an actual ground fault either internally or externally of bus section 13 before ground relay 56 is energized, thereby preventing isolation of bus section 13 on interphase faults which, due to the inaccuracy of the current transformers, cause energization of differential ground fault relay 41.

External double line-to-ground faults, however, may still cause isolation of sound bus section 13 since there is actual ground current under such conditions in ground circuit 25 which energizes ground relay 56 and, furthermore, due to the fact that an interphase fault is also involved causing very high currents to flow, an apparent ground fault current will flow in the differential relay circuit energizing differential ground fault relay 41. Therefore, since both ground relay 56 and differential ground fault relay 41 are energized, simultaneous tripping of all the circuit breakers will occur. My invention is particularly concerned with preventing isolation of bus section 13 on external double line-to-ground faults and I accomplish this by providing a protective apparatus which distinguishes between double line-to-ground faults and single line-to-ground faults.

It can be proved that there is practically a two-to-one variation of the current flowing in the ground circuit 25 of the system illustrated in Fig. 1 for a single line-to-ground short circuit on the system as compared with a double line-to-ground short circuit. As will be understood by those skilled in the art, the ground current flowing in ground circuit 25 is equal to three times the zero phase sequence component of current which flows in the system, that is, $i_g = 3 i_0$ where $i_g$ is the ground current and $i_0$ is the zero phase component of current on the system.

On pages 189 to 196 of volume 40 of the General Electric Review in an article entitled "Calculation of short-circuit currents in A-C networks," I have derived the equations for the zero phase sequence component of current under line-to-ground short-circuit and double line-to-ground short-circuit conditions. The zero phase sequence component of current when a line-to-ground fault condition exists is represented by the following equation:

$$i_0 = \frac{e_a}{z_1 + z_2 + z_0}$$

where $e_a$ is the applied voltage, $z_1$ is the positive phase sequence impedance, $z_2$ is the negative phase sequence impedance, and $z_0$ is the zero phase sequence impedance including the impedance 26 of ground circuit 25. For a double line-to-ground short circuit on the other hand, the zero phase sequence component of current is represented by the following equation:

$$i_0 = \frac{-e_a z_2}{z_1 z_2 + z_0 (z_1 + z_2)}$$

If, as is usually the case, the positive phase sequence impedance $z_1$ is nearly equal to the negative phase sequence impedance $z_2$ and the zero phase sequence impedance $z_0$ including the ground impedance 26 of Fig. 1 is very large as compared to $z_1$ and $z_2$, the latter two impedances may be neglected so that the above equations simplify as follows: For a line-to-ground short circuit $$i_0 = \frac{e_a}{z_0}$$

while for a double line-to-ground $$i_0 = \frac{e_a}{2 z_0}$$

Therefore, since substantially twice as much current flows in ground circuit 25 on a line-to-ground fault, then on a double line-to-ground fault, I provide a protective system which distinguishes between these two types of faults by providing a relay 56 which will operate on a little over half of the maximum ground current which can flow through ground circuit 25. Since the ground impedance is illustrated as the resistor 26, the time constant of the circuit is very short so the direct-current component of short-circuit current disappears very rapidly so as not to interfere with the relay operation described above.

If a high-impedance short circuit should occur on bus section 13, it might be possible under certain conditions that insufficient current would flow through relay 56 which does not operate on double line-to-ground faults that it would not close its contacts and, accordingly, I provide a "back-up" relay 59 having its contacts 60 connected in parallel with contacts 57 and which would be set to operate at very low values of ground current in ground circuit 25 but which would be provided with a long time delay so that eventually these high-impedance short circuits or ground faults on bus section 13 would be removed by operation of "back-up" relay 59.

By the above described protective system, isolation of bus section 13 will not occur on a double line-to-ground short circuit whether the fault be external or internal. However, the possibility of a double line-to-ground circuit is so remote on bus section 13 when of the isolated phase type that this is no handicap. Furthermore, if the bus is not of the isolated phase type, rence of a fault condition thereon, means for deriving a current dependent upon the vector sum of all the currents into and out of said section, a relay responsive to said derived current tending to initiate the simultaneous operation of said switching means for isolating said section, and means responsive to current flowing in the grounded neutral connection of said source for distinguishing between single line-to-ground and double line-to-ground faults on said bus section for preventing said relay from causing isolation of said section except upon the occurrence of said first-mentioned type of fault thereon.

8. In a protective system for a polyphase alternating-current sectionalized bus, a Y-connected source of electrical energy having a grounded neutral for supplying alternating current to one section of said bus, a plurality of feeders connected to said section, switching means for isolating said section upon the occurrence of a fault condition thereon, means for deriving a current dependent upon the vector sum of all the currents into and out of said section, a relay responsive to said derived current including a pair of contacts, a second relay responsive to current flowing in the grounded neutral connection of said source including a plurality of contacts, said first and second-mentioned relay contacts being connected in series in a circuit for controlling the simultaneous tripping of all of said switching means for isolating said bus section, said last-mentioned relay being so constructed and arranged to distinguish between single line-to-ground and double line-to-ground faults on said bus section so that isolation of said section will be accomplished only upon the occurrence of said first-mentioned type of fault thereon.

9. In a protective system for a polyphase alternating-current sectionalized bus, a Y-connected source of electrical energy having a grounded neutral for supplying alternating current to one section of said bus, a plurality of feeders connected to said section, switching means for isolating said section upon the occurrence of a fault condition thereon, means for deriving a current dependent upon the vector sum of all the currents into and out of said section, a relay responsive to said derived current including a pair of contacts, a second relay responsive to current flowing in the grounded neutral connection of said source including a plurality of contacts, said first and second-mentioned relay contacts being connected in series in a circuit for controlling the simultaneous tripping of all of said switching means for isolating said bus section, said last-mentioned relay being so constructed and arranged to distinguish between single line-to-ground and double line-to-ground faults on said bus section so that isolation of said section will be accomplished only upon the occurrence of said first-mentioned type of fault thereon, and means for preventing any direct-current component of said fault current from interfering with the operation of said last-mentioned relay.

WILLIAM M. HANNA.